(12) United States Patent
Lin et al.

(10) Patent No.: US 10,396,524 B2
(45) Date of Patent: Aug. 27, 2019

(54) HIGH POWER OPTICAL FIBER LASER COMBINER

(71) Applicant: NATIONAL CHUNG SHAN INSTITUTE OF SCIENCE AND TECHNOLOGY, Taoyuan (TW)

(72) Inventors: Jian-Hung Lin, Taoyuan (TW); Chiang-Hsin Lin, Taoyuan (TW); Po-Tse Tai, Taoyuan (TW); Wei-Chung Yen, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 16/108,166

(22) Filed: Aug. 22, 2018

(65) Prior Publication Data

US 2019/0199055 A1    Jun. 27, 2019

(30) Foreign Application Priority Data

Dec. 26, 2017   (TW) .............................. 106145714 A

(51) Int. Cl.
| | |
|---|---|
| *G02B 6/36* | (2006.01) |
| *H01S 3/23* | (2006.01) |
| *H01S 3/067* | (2006.01) |
| *H01S 3/04* | (2006.01) |
| *G02B 6/28* | (2006.01) |
| *G02B 6/255* | (2006.01) |

(52) U.S. Cl.
CPC ............ *H01S 3/2383* (2013.01); *G02B 6/255* (2013.01); *G02B 6/2804* (2013.01); *H01S 3/0405* (2013.01); *H01S 3/06708* (2013.01)

(58) Field of Classification Search
USPC ............................................ 385/10, 31, 125
See application file for complete search history.

(56) References Cited

U.S. PATENT DOCUMENTS

| | | |
|---|---|---|
| 7,532,792 B2 | 5/2009 | Skovgaard et al. |
| 2014/0241385 A1 | 8/2014 | Fomin et al. |
| 2015/0049983 A1 | 2/2015 | Fisher et al. |
| 2016/0109659 A1* | 4/2016 | Jiang ...................... G02B 6/305 385/14 |

FOREIGN PATENT DOCUMENTS

KR          101188344       * 10/2012

* cited by examiner

*Primary Examiner* — Eric Wong
(74) *Attorney, Agent, or Firm* — Schmeiser, Olsen & Watts, LLP

(57) ABSTRACT

A high power optical fiber laser combiner includes a plurality of input port fibers; an output port fiber including a cladding and a propagating layer, the cladding being used to clad the propagating layer, and the cladding including a micro-nano structure on a surface thereof for removing a residual power in the cladding; and a bundling portion for bundling the input port fibers, and the input port fibers spliced to the output port fiber. The heat effect accumulation of laser power on the cladding can effectively be reduced by the micro-nano structure of the high power optical fiber laser combiner. The tolerant power and bundling power of the optical fiber laser combiner can be raised to increase the output power of the optical laser.

9 Claims, 5 Drawing Sheets

HIGH POWER OPTICAL FIBER LASER COMBINER

CROSS-REFERENCE TO RELATED APPLICATION

This non-provisional application claims priority under 35 U.S.C. § 119(a) on Patent Application No. 106145714, filed in Taiwan, R.O.C. on Dec. 26, 2017, the entire contents of which are hereby incorporated by reference.

FIELD OF THE INVENTION

The present disclosure relates to an optical fiber combiner, especially to a high power optical fiber laser combiner.

BACKGROUND OF THE INVENTION

A pump or laser combiner is one of important components in a high power optical fiber laser system, and the pump is used to be a laser diode pump and the laser combiner provides optical fiber laser to inject into the high power optical fiber laser system. Referring to a power source for driving system, because a laser combiner can be coupled to multiple mode optical fibers that have a higher luminance, the power in multiple bundles can directly be coupled to be a high power multiple mode optical fiber laser by the laser combiner. However, with a coupling power increasing, a laser combiner often has a problem with overheating caused by the residual power on the cladding thereof, and it may limit the coupling power of the laser combiner.

In the prior art, there are some discussion about an optical fiber having thermally protecting structure. For example, disclosed in U.S. 2015/0049983 A1 is an optical fiber device that has a mode stripper thermally protecting structural adhesive composition. As disclosed in the patent, an output fiber of the optical fiber device has a first layer of mode stripper adhesive and a second layer of structural adhesive, and the mode stripper adhesive is positioned closer to the first optical element than the structural adhesive to strip a majority of power of cladding guided mode so that the power fails to reach the structural adhesive. The mode stripper adhesive has a lower hardness as compared to the structural adhesive, and is refractive indexed matched to an outermost layer of the output fiber that it is in direct contact with. However, disclosed in the patent, the mode stripper consists of a composition that has a refractive index higher than a refractive index of the surface of the cladding, and the composition can be heated by power of the light stripped so that a maximum stripping power is substantially limited and the operative power of optical fiber device is also limited.

U.S. 2014/0241385 A1 discloses a low-mode high power fiber combiner that is configured with a combiner end fiber spliced to a combiner output fiber. A light stripper is provided on specific zones along the combiner end fiber and output fiber and the specific zones are provided with respective refractive indices and materials, and may respectively strip laser light caused by forward and back-reflected light to protect the combiner for operating properly. Disclosed in the patent, there are various way to strip forward and back-reflected laser light power so that the stripped power may be converted into heat to disperse to different zones of the optical fiber, and thus the tolerant power of the combiner can be raised. However, the configuration may increase the total length of the combiner and the complexity of system.

U.S. Pat. No. 7,532,792 B2 discloses an optical coupler, a method of its fabrication and use, wherein the optical coupler consists of at least two input fibers and one output fiber. The input fibers are bundled into a bundle and extended to a taper to reduce a cross sectional area of the bundling structure, and an end of the input fiber may engage to an input face of the output fiber. Described in the patent, a power optical coupler can be made by a soluble silicate, such as for example sodium silicate and serves as a cladding power stripper to remove the laser light power propagating in the cladding. Also described in the patent, sodium silicate coated on a surface of the optical fiber is 2 mm in length, the drying for the surface coated with sodium silicate is performed using force air after finishing the coating, and small flakes of sodium silicate are formed on the surface. The coating material is attached to the cladding of the optical fiber to leave a non-smooth surface of the cladding for scattering the light power of the cladding. In addition, sodium silicate is heated such that the layer of sodium silicate inside may produce bubbles, and the bubbled surface improves the scattering performance of the light power. However, the soluble silicate used in the patent has a higher melting point, and must be optical use level to meet the requirement of a high power application. Also, the process of drying or heating may affect a stripping rate of the cladding power, even has a risk to damage the structure of device.

Therefore, a need exists in the industry for developing an optical fiber laser combiner that has a higher tolerant power, and is easy to integrate with a process of laser combiner without increasing the volume of the device. The tolerant power and bundling power of the optical fiber laser combiner can be raised to increase the output power of the optical laser.

SUMMARY OF THE INVENTION

In view of the above disadvantages of the prior art, the main object of the present disclosure is to provide a high power optical fiber laser combiner which can integrate elements of a plurality of input port fibers, an output port fiber, a bundling portion, a micro-nano structure, and so on. The heat effect accumulation of laser power on the cladding can effectively be reduced by the micro-nano structure of the high power optical fiber laser combiner. The tolerant power and bundling power of the optical fiber laser combiner can be raised to increase the output power of the optical laser.

The above object is achieved by a high power optical fiber laser combiner according to an aspect of the present disclosure. The high power optical fiber laser combiner includes a plurality of input port fibers; an output port fiber including a cladding and a propagating layer, the cladding being used to clad the propagating layer, and the cladding including a micro-nano structure on a surface thereof for removing a residual power in the cladding; and a bundling portion for bundling the input port fibers, and the input port fibers spliced to the output port fiber.

The micro-nano structure of the present disclosure is designated a micro-structure having a thickness of one nano-level ($10^{-9}$ m).

In one embodiment, the input port fibers are single mode or multiple mode optical fiber.

In one embodiment, the output port fiber is made from glass tube technology.

In one embodiment, the cladding has a range of working temperature from room temperature to 80° C.

In one embodiment, the micro-nano structure has a range of thickness from 1 nm to 20 μm, and a range of length from 1 mm to 10 cm.

In one embodiment, the micro-nano structure is an embedded type or an attached type.

In one embodiment, the output port fiber propagates a light power of 200 W to 12 kW.

In one embodiment, the output port fiber is single mode or multiple mode optical fiber.

The above description and the following detailed description and the accompanying drawings are the way, means and effect made for further describing the present disclosure which can achieve a predetermined object. Other objects and advantages of the present disclosure will become apparent from the following description and the drawings.

DETAILED DESCRIPTION OF THE PREFERRED EMBODIMENTS

The advantages and effects of the present disclosure will be apparent from the following detailed description for the specific embodiments when a person having ordinary skill in the art reads the disclosure of the specification.

Figure 1:
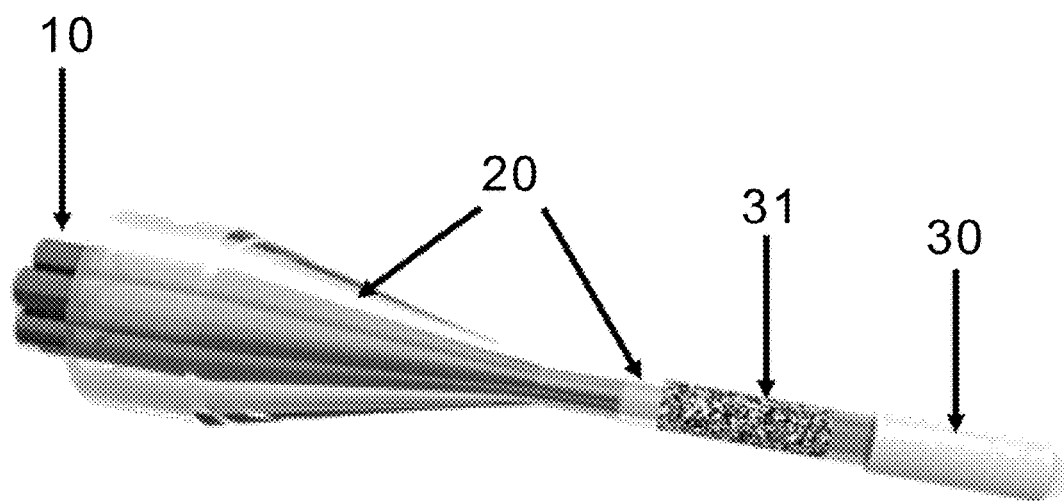
FIG. 1 shows a schematic view of a high power optical fiber laser combiner of an embodiment of the present disclosure.

Please refer to FIG. 1. As shown in FIG. 1, the present disclosure provides a high power optical fiber laser combiner including a plurality of input port fibers (10) as an input end of optical fiber laser; a bundling portion (20) for bundling and tapering the input port fibers (10); and an output port fiber (30) spliced with the input port fibers (10), wherein the input port fibers (10) have at least two single mode or multiple mode optical fibers, the output port fiber (30) has a micro-nano structure (31) located on a surface of cladding of the output port fiber (30). As the micro-nano structure (31) is a periodic grating structure, the diffraction principle of the grating is used. As the micro-nano structure is aperiodic, a full reflection angle of the laser light that propagates in the cladding of the output port fiber (30) is changed or destroyed so that a residual laser power can be removed from the cladding, and the removed laser power can be injected into a packaged heat dissipation mechanism, thereby removing the residual laser power of the cladding. The micro-nano structure (31) can be divided into an embedded type and an attached type, wherein the embedded type is embedding the micro-nano structure on a surface of the cladding of the input port by using a chemical etching method or mask lithography technology, and the attached type is attaching an optical dielectric material that has a high transmittance, low absorption and high melting point on a surface of the cladding of the input port.

Figure 2:
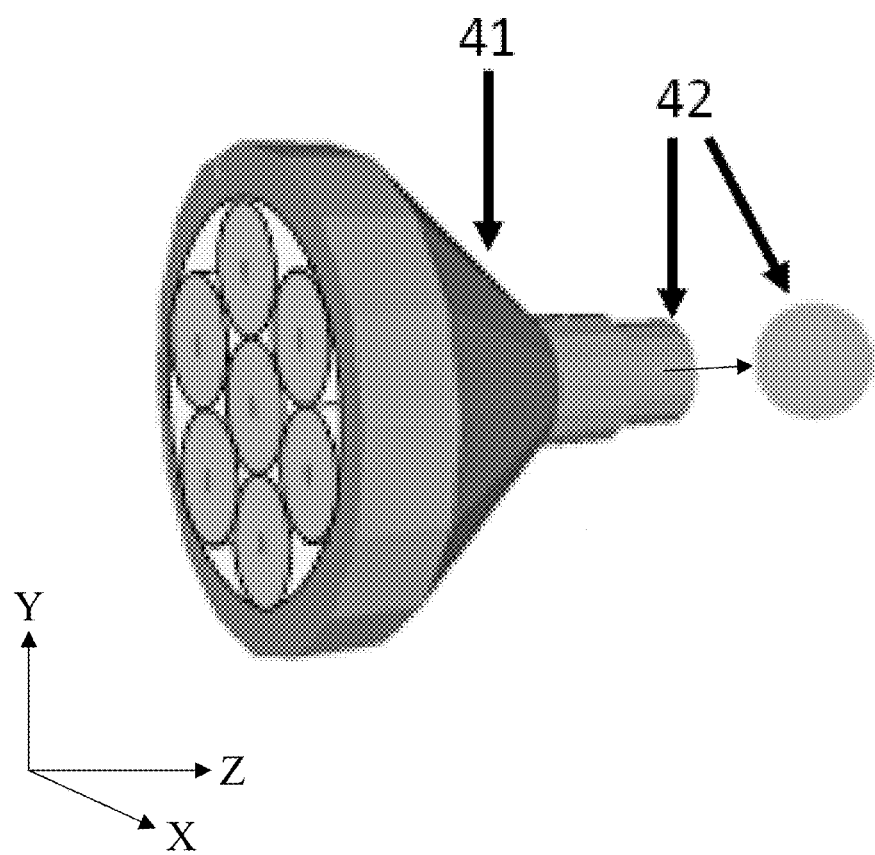
FIG. 2 shows a simulation schematic view of an optical fiber laser combiner.
Figure 3:
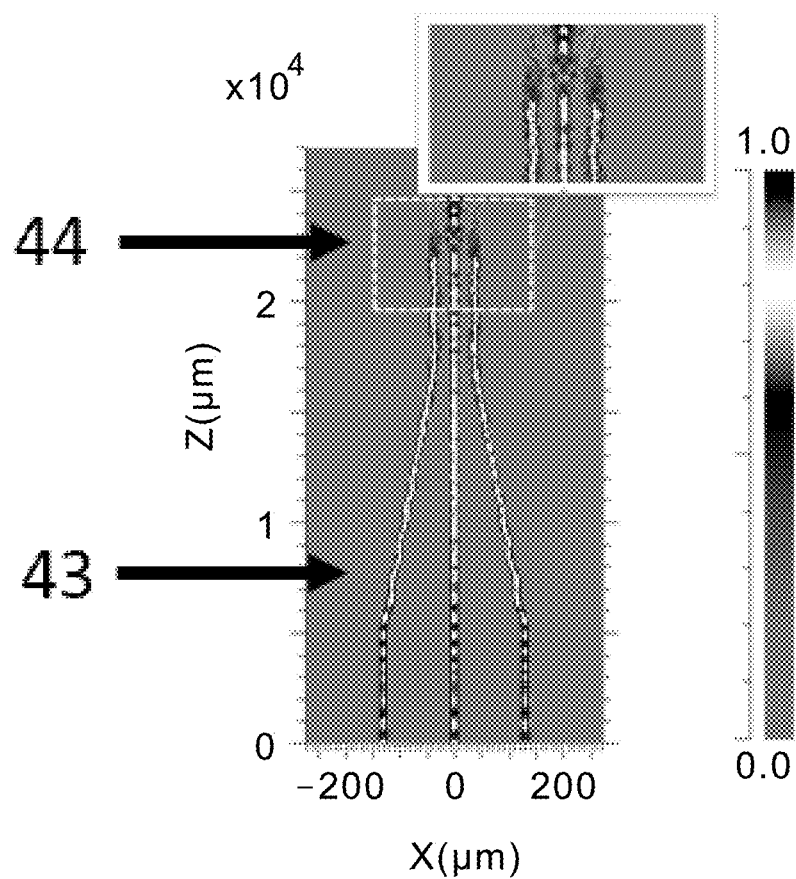
FIG. 3 shows a simulation schematic view of a light power distribution of an optical fiber laser combiner.

Please refer to FIGS. 2 and 3. FIG. 2 shows a simulation schematic view of an optical fiber laser combiner of an embodiment of the present disclosure. In an embodiment, the design and analysis of a fiber laser combiner is carried out by numerical simulation of finite-difference beam propagation method (FD-BPM). The process used for a design of optical fiber element of the optical fiber laser combiner is glass tube technology. An advantage of the glass tube technology is that the process is simple without complicated bundling equipment and special process. It is suitable for mass production of the elements. In the theoretical calculation, the relevant parameters of the glass tube technology are put into the optical fiber laser combiner, and the elements are optimized. In a bundling process of 7 proximal single mode optical fibers, bundling and tapering process is performed by glass tube technology, 7 proximal single mode optical fibers consist of a plurality of input port fibers, and form an output port fiber (42) through a bundling portion (41), and the design parameters of input port fibers (7 proximal single mode double-clad optical fibers) and the output port fiber (1 multiple mode optical fiber) of the optical fiber laser combiner as the following table:

| 7 proximal single mode double-clad optical fibers | |
| --- | --- |
| Diameter of fiber | 20 ± 1.5(μm)/130 ± 1.0(μm) |
| Numerical aperture (NA) | 0.08 ± 0.005/0.46 |
| Refractive index of fiber core ($n_{core}$) | 1.446 |
| Refractive index of inner cladding ($n_{cladding}$) | 1.444 |
| Diameter of outer cladding optical fiber | 245 ± 10(μm) |
| 1 multiple mode optical fiber | |
| Diameter of fiber | 105 ± 3.0(μm)/125 ± 2.0(μm) |
| Numerical aperture (NA) | 0.22 ± 0.02 |
| Refractive index of fiber core ($n_{core}$) | 1.446 |
| Refractive index of inner cladding ($n_{cladding}$) | 1.429 |
| Diameter of outer cladding optical fiber | 245 ± 15(μm) |

Referring to the relevant parameters of the glass tube, the glass tube is made from a material of ground glass tube doped with ions of fluorine ("F") and has a refractive index of 1.429 as well as a numerical aperture of 0.22. The refractive index of 1.429 is smaller than a refractive index (1.444) of inner cladding of 7 proximal single mode cladding optical fibers so that the laser light can effectively be limited in the proximal single mode optical fiber. The outer diameter and the inner diameter of the ground glass tube respectively are 1100 μm±20 μm and 800 μm±10 μm.

In order to calculate the laser power that diverges to the glass layer of the glass tube and in the cladding of output multiple mode optical fiber, the integral calculation of the photoelectric field power of the bundling portion and the output port fiber (42) is performed first, the bundling portion is divided into a tapering zone (43) and a belt zone (44), a tapering and splicing are respectively performed for the output port fiber (42), and the output port fiber (42) can be divided into a cladding and a propagating layer, wherein the propagating layer is coated with the cladding, the tapering zone (43) and the belt zone (44) are constant respectively on 12 mm and 5 mm in length, Y axis coordinate is set to 0, and the results of which are calculated as the following table:

| Power integral region | Integral power efficiency |
| --- | --- |
| Inner of glass tube (7 proximal single mode optical fibers and inner air portion) | 0.9915 |
| glass layer of glass tube and inner of glass tube | 0.9972 |
| Propagating layer of output multiple mode optical fiber (core) | 0.9879 |
| Propagating layer of output multiple mode optical fiber (core) and cladding | 0.9929 |

The power efficiency of the glass tube inner (7 proximal single mode optical fibers and inner air portion) in the belt zone (44) is 0.9915, and the glass layer of the glass tube included is 0.9972. After coupling to the output multiple mode optical fiber, the power efficiency of a propagating layer of output multiple mode optical fiber (core) is 0.9879, and the cladding included is 0.9929. There is about 0.43% of the power from the belt zone (44) to the output multimode optical fiber diverged into the air, having about 0.5% of the power in the cladding of the output multiple mode optical fiber. With an application of a four kilowatts (4 kW) laser combiner, 0.5% laser power of which is diverged nearly the power of 20 W at a site of the belt zone (44) spliced with the output multiple mode optical fiber, and the laser power of 20 W remains in the cladding of the output multiple mode optical fiber, and the present disclosure can treat the laser power that is remained in the cladding of the output multiple mode optical fiber.

In an embodiment of the application of the present disclosure, a high power fiber laser combiner is configured with an input port fiber (10) of 7 proximal single mode double-clad optical fibers bundled by glass tube technology, then heating tapered by a welding machine, and finally spliced with an output port multiple mode optical fiber having a micro-nano structure. The structural parameters of design as follows: the tapering rate of bundling fiber is 3, the tapering length is 10 mm, the belt length is 5 mm, and the output port fiber is far from the site of splicing the input port bundling fiber about 2-3 mm. The micro-nano structure is made on a surface of the cladding of the output port fiber by a chemical etching method. Because the thickness of the cladding of the output port multiple mode optical fiber is only 20 μm, the etching time must be controlled properly to ensure the etching being less than 20 μm and the coupling efficiency being kept to the best. In an experiment, a set of optical fiber lasers with 300 W and 1 kW is used as a laser light source, the laser light is propagated from an input port to an output port of a laser combiner of the present disclosure, the power of the laser light outputted from the output port is determined by a power meter for quantifying the coupling efficiency of the element. During the determination, a thermographer is used to determine and record the temperature change of the combiner.

To highlight the advantages of using the micro-nano structure, two commonly used methods of a thermal pad and a glue having a high refractive index are used to compare with, of which the thermal pad directly helps the heat dissipation of the outer cladding of the output port, and the glue having a high refractive index is coated on the inner cladding with the principle of the same as the micro-nano structure by mainly removing the residual laser power in the inner cladding of the output port to reduce power load of the outer cladding of the output port. Basically, common outer claddings are polymer materials that can only withstand 20 W of laser power, and the temperature must not exceed its glass transition temperature (Tg), about 80° C.

Figure 4:
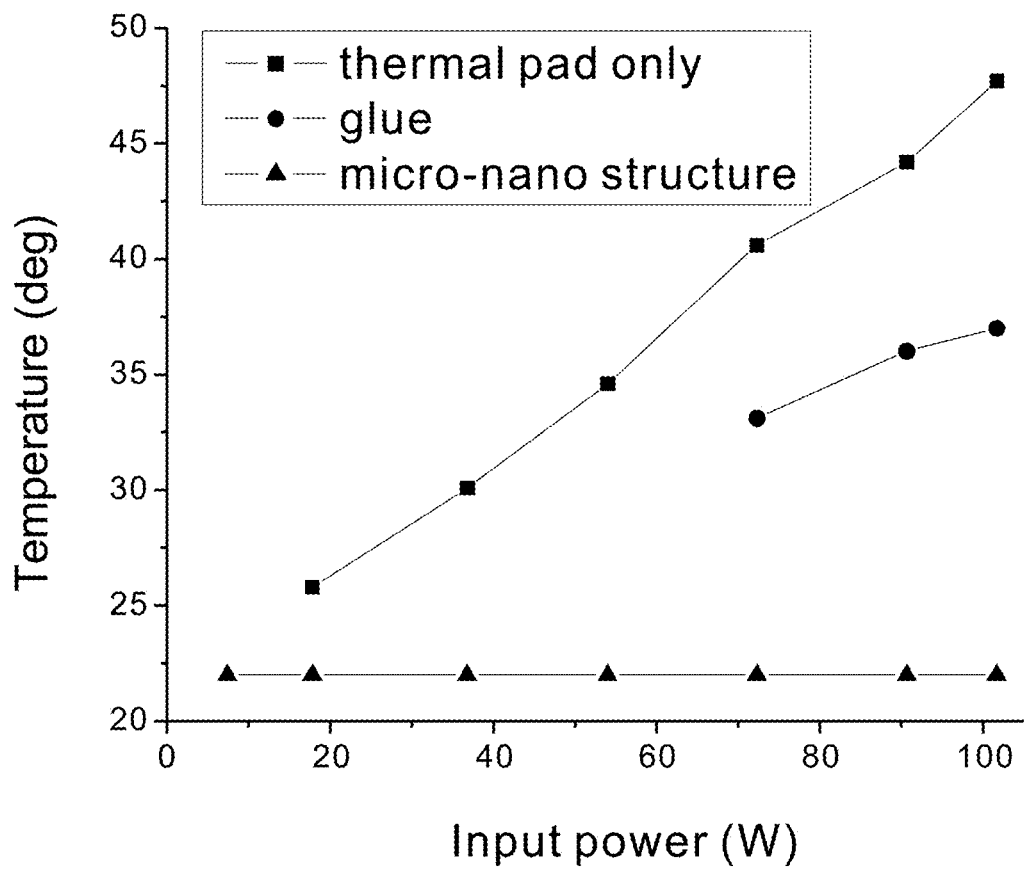
FIG. 4 is a graph showing the relationship of temperature and injection power of laser combiners made by three methods.

Please refer to FIG. 4. FIG. 4 is a graph showing the relationship of temperature and injection power of laser combiners made by three methods, wherein Y axis shows temperature of the combiner, and X axis shows laser light power outputted from the output port, as well as square dot indicates the thermal pad, round dot indicates the glue with a high refractive index and triangular dot indicates the micro-nano structure of the present disclosure. As shown in FIG. 4, the slope of temperature rise of using the thermal pad and the glue with a high refractive index are respective 0.587° C./W and 0.1° C./W.

Figures 5A, 5B:
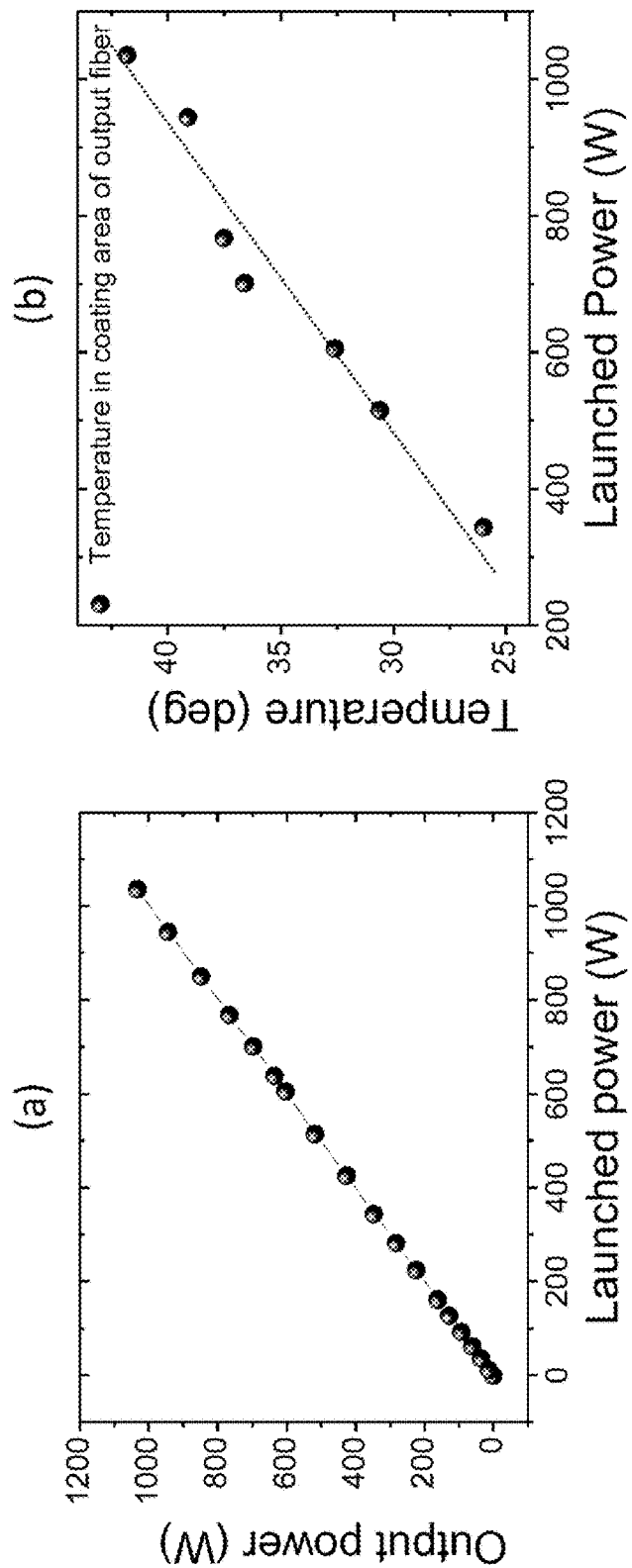
FIG. 5A is a graph showing the relationship of launched power and output power of a single input port of an embodiment of the present disclosure.
FIG. 5B is a graph showing the relationship of temperature and launched power of a single input port of an embodiment of the present disclosure.

In order to further determine the property and the performance of temperature rise of the laser combiner of the present disclosure having the micro-nano structure, the injection power is raised to 202 W, and all the 7 input port have the coupling efficiency more than 98%. It is found that the element of the present disclosure can withstand the injection power of 1 kW by the previous determination of hundreds of Watts injection. Please refer to FIGS. 5A and 5B. FIG. 5A is a graph showing the relationship of launched power and output power of a single input port of an embodiment of the present disclosure. FIG. 5B is a graph showing the relationship of temperature and launched power of a single input port of an embodiment of the present disclosure. The round dots in FIGS. 5A and 5B indicate the data of determination. As shown in the drawing, as the launched power is raised to 1 kW, the coupling efficiency thereof is the same with 200 W determination. The micro-nano structure in the element has a length of 0.5 cm. The residual power on the cladding of the output port that is removed is theoretically estimated to be about 5 W by the residual power on the outer cladding of the output port being 0.5%. In an experiment, the slope of temperature rise of the element is 0.02° C./W, and the temperature that the outer cladding can withstand is about 80° C. (Tg=80° C.). Under the estimation of the two conditions of the slope of temperature rise and withstanding temperature, the micro-nano structure per centimeter in length can remove power of 30 W (30 W/cm). The element is anticipated to have a coupling power up to 3 kW to date, but the element of the present disclosure is not limited to that. The micro-nano structure of the present disclosure per centimeter in length can remove power of 30 W, that is, the micro-nano structure is increased to 1 cm in length with the residual power on the cladding that is removed the most is 30 W. When the residual power on the outer cladding of the output port is 0.5%, the anticipated coupling power of the element could be estimated up to 6 kW. Similarly, the micro-nano structure is increased to 2 cm in length with the residual power on the cladding that is removed the most is 60 W, and the anticipated coupling power of the element could be estimated up to 12 kW.

The experiment has demonstrated that the present disclosure relating to a laser combiner having a micro-nano structure can be applied to multi-kW level optical fiber laser combiner. The high power optical fiber laser combiner of the present disclosure has advantages as follows: the laser combiner has a higher tolerant power, and can remove the power on the cladding of 200 W that is demonstrated by the experiment; the laser combiner has a high augmentation of the power, and can raise the optical fiber laser to ten something kW and above by a distribution mechanism; the laser combiner is easy to integrate with a process of laser combiner without increasing the original volume of the device; except that the laser combiner can be applied in a pump or laser combiner of the high power optical fiber laser system, and the laser combiner of the design can be directly applied to directly couple the power of multiple bundles into a high kW level multiple mode optical fiber laser.

The above embodiments of the present disclosure made only by way of example to describe the feature and effect of the present disclosure, and it should not be considered as the scope of substantial technical content is limited thereby. Various possible modifications and alternations of the embodiments could be carried out by those of ordinary skill in the art without departing from the spirit and scope of the present disclosure. Therefore, the scope of the present disclosure is based on the appended claims.

What is claimed is:

1. A high power optical fiber laser combiner, comprising:
   a plurality of input port fibers;
   an output port fiber including a cladding and a propagating layer, the cladding being used to clad the propagating layer, and the cladding including a micro-nano periodic grating structure on a surface thereof for removing a residual power in the cladding by using the diffraction principle of the grating;
   a bundling portion for bundling the input port fibers, and the input port fibers spliced to the output port fiber.

2. The high power optical fiber laser combiner of claim 1, wherein the input port fibers are single mode or multiple mode optical fiber.

3. The high power optical fiber laser combiner of claim 1, wherein the output port fiber is made from glass tube technology.

4. The high power optical fiber laser combiner of claim 1, wherein the cladding has a range of working temperature from room temperature to 80° C.

5. The high power optical fiber laser combiner of claim 1, wherein the micro-nano structure has a range of thickness from 1 nm to 20 μm, and a range of length from 1 mm to 10 cm.

6. The high power optical fiber laser combiner of claim 1, wherein the micro-nano structure is an embedded type or an attached type.

7. The high power optical fiber laser combiner of claim 1, wherein the output port fiber propagates a light power of 200 W to 12 kW.

8. The high power optical fiber laser combiner of claim 1, wherein the output port fiber is single mode or multiple mode optical fiber.

9. A high power optical fiber laser combiner, comprising:
   a plurality of input port fibers;
   an output port fiber including a cladding and a propagating layer, the cladding being used to clad the propagating layer, and the cladding including a micro-nano aperiodic structure on a surface thereof for removing a residual power in the cladding by changing or destroying a full reflection angle of the laser light that propagates in the cladding of the output port fiber; and
   a bundling portion for bundling the input port fibers, and the input port fibers spliced to the output port fiber.

* * * * *